United States Patent
Snow

[11] Patent Number: 5,811,041
[45] Date of Patent: Sep. 22, 1998

[54] METHOD AND APPARATUS FOR VACUUM TRANSFER MOLDING

[75] Inventor: Mike Snow, Caledonia, Minn.

[73] Assignee: Miken Composites Company, LLC., Hartland, Wis.

[21] Appl. No.: 910,100

[22] Filed: Aug. 13, 1997

[51] Int. Cl.$^6$ .................................................. B29C 45/02
[52] U.S. Cl. ................. 264/102; 264/328.4; 264/328.16; 425/544; 425/546; 425/584; 425/589
[58] Field of Search ..................................... 264/102, 257, 264/328.4, 328.16; 425/127, 544, 546, 547, 578, 584, 586, 589

[56] References Cited

U.S. PATENT DOCUMENTS

| | | |
|---|---|---|
| 2,475,378 | 7/1949 | De Ghetto . |
| 5,435,953 | 7/1995 | Osada et al. . |
| 5,460,502 | 10/1995 | Majercak . |
| 5,501,587 | 3/1996 | Kwak . |
| 5,626,887 | 5/1997 | Chou et al. . |

FOREIGN PATENT DOCUMENTS

| | | |
|---|---|---|
| 59-148622 | 8/1984 | Japan . |
| 62-273742 | 11/1987 | Japan . |

*Primary Examiner*—Jill L. Heitbrink
*Attorney, Agent, or Firm*—Richard C. Litman

[57] ABSTRACT

Method and apparatus for manufacturing void free products using vacuum transfer molding. The method comprises evacuating gas from a preheated resin mixture in an injection accumulator assembly before injection into a mold. The apparatus includes a fixed upper platen assembly supporting an injection accumulator assembly having appended thereto a gas exhausting means and a feed material holding canister on its upper surface and an upper match mold portion on its lower surface. The movable lower platen assembly supports a lower match mold portion on its upper surface and is supported by a plurality of hydraulic cylinders of a bottom plate assembly. The platen assemblies include a sandwich of a press plate, an insulating fiber board and an internally heated platen.

18 Claims, 3 Drawing Sheets

METHOD AND APPARATUS FOR VACUUM TRANSFER MOLDING

BACKGROUND OF THE INVENTION

1. Field of the Invention

The present invention relates to an improved method of vacuum transfer molding of products and the apparatus for implementing the method.

2. Description of the Related Art

The related art shows various transfer molding presses or parts thereof, and methods for forming various transfer molded products. The related art of interest will be discussed in the order of their perceived relevance to the present invention.

Japan Patent No. 59-148622 issued on Aug. 25, 1984, to Janome Sewing Machine, Ltd. describes a vacuum transfer molding apparatus for forming a model from resin under a vacuum. An upper fixed platen, as best understood, is supported by supports installed on a base plate. The lower platen has a vacuum chamber located underneath for evacuation by a vacuum pump. The plunger is located on top of the upper platen and forces the lower platen up for molding. The liquid resin is placed in the vacuum chamber and poured into a frame containing a model for molding. Its variable resin feeding inlets, reverse plunger direction and a separate vacuum chamber distinguish this patent from the present invention.

U.S. Pat. No. 2,475,378 issued on Jul. 5, 1949, to Anselm De Ghetto describes a transfer molding press for transfer molding of rubber products. A cylindrical base of a hydraulic ram supports a piston and a lower movable platen. The upper platen is fixed in place by four corner strain rods. A sealed hydraulic element drives a piston into the auxiliary platen or face of the lower platen (transfer molding cavity) which is cored for steam heating. An auxiliary platen of the upper platen serves as a face. The hydraulically driven piston and the lack of a vacuum distinguishes this reference from the present invention.

Japan Patent No. 62-273742 issued on Nov. 27, 1987, to Sumitomo Heavy Industries, K.K. describes a transfer molding device having a resin material chamber connected with the mold cavity with a plunger above the resin chamber to produce resinous tablets. A plunger housed in the upper platen applies downward pressure on a powder feed to form a tablet one at a time in an ejector plate with pill ejector pins positioned in a circle of a carousel. The lower platen does not move and is sealed against the upper platen. A vacuum is applied before the resinous tablet is pressed by the plunger. This reference is distinguished by a molding apparatus which does not separate its platens during the carousel molding process.

U.S. Pat. No. 5,626,887 issued on May 1, 1997, to C. H. Chou et al. describes an air exhaust mold plunger in a conventional mold apparatus. A vent seal device and a spring evacuates air through an exhaust port and two channels prior to moving the melted mold compound in the runner to the mold cavities in another area. The apparatus is distinguished by its separate molding cavities even though an air removal step (not a vacuum) is employed.

U.S. Pat. No. 5,435,953 issued on Jul. 25, 1995, to Michio Osada et al. describes a method of molding resin for sealing an electronic device to remove voids. A sealed space is formed between molding surfaces of upper and lower mold sections by covering an outer side periphery of a pot, a resin path and a cavity. The expanding heated resin tablet exhausts the air and moisture into the sealed path portion which is evacuated. The process of pilling and the apparatus based on multiple plungers and ejector pins is distinguished by the single plunger and non-ejector pin system of the present invention.

U.S. Pat. No. 5,501,587 issued on Mar. 26, 1996, to Nho K. Kwak describes a molding machine for packaging a semiconductor product with two transfer rods for compressing resin into a leadframe of the mold. One transfer rod moves resin into the mold when the rod is moved downward and the second transfer rod will move resin into the mold when the rod is moved upward. The resin charge is apparently added to the port when the molds are separated. No vacuum operating steps have been shown.

U.S. Pat. No. 5,460,502 issued on Oct. 24, 1995, to Michael L. Majercak describes a plunger apparatus used in a resin molding device for encapsulating electronic components. At least one annular recess is located in the bottom side of the plunger. The annular recess redirects the plasticized resin to flow towards the mold cavities and away from the interface between the plunger and the cylinder of the molding device. This modification solves the problem of excess gas and resin flowing away from the cavities. The apparatus is limited to the plunger and is distinct from the vertical distribution of the present invention.

None of the above inventions and patents, taken either singularly or in combination, is seen to describe the instant invention as claimed. Thus, a method and apparatus for manufacturing products using vacuum transfer molding solving the aforementioned problems is desired.

SUMMARY OF THE INVENTION

Accordingly, it is a principal object of the invention to provide an apparatus for vacuum transfer molding.

It is another object of the invention to provide a method for vacuum transfer molding products without voids.

It is a further object of the invention to provide a vacuum transfer molding apparatus with heated platens.

Still another object of the invention is to provide a vacuum transfer molding apparatus with an accumulation cylinder with a vacuum port and a molten resin port.

It is an object of the invention to provide improved elements and arrangements thereof in a method and apparatus for vacuum transfer molding for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
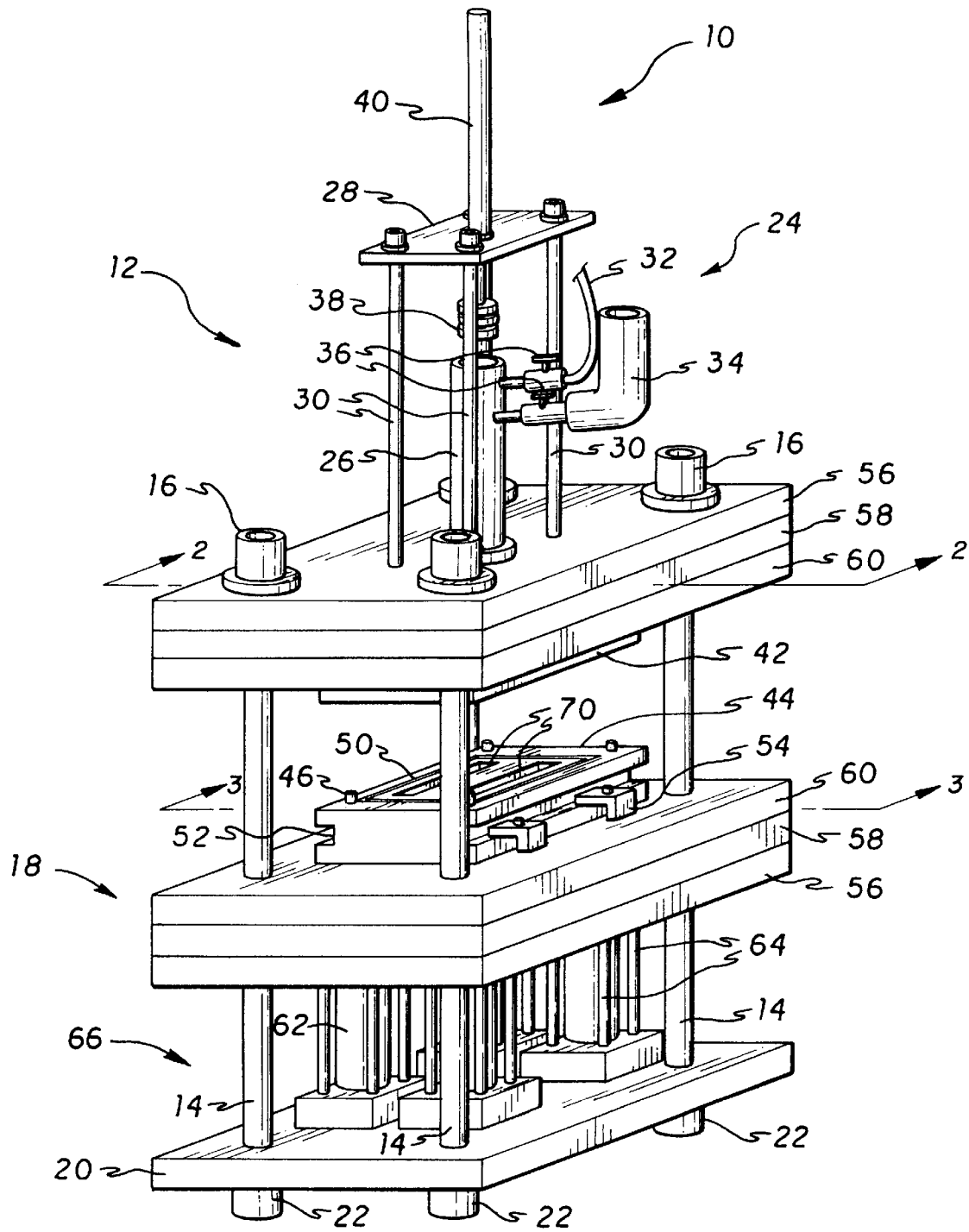
FIG. 1 is an environmental, perspective view of a vacuum transfer molding apparatus according to the present invention.

The present invention provides a method and apparatus for manufacturing void-free, mixed resin products by vacuum transfer molding. In FIG. 1, the press apparatus 10 is shown with the fixed upper rectangular platen assembly 12 supported by four steel cylindrical studs 14 with nuts 16 shown round, but can be hexagonal nuts. The studs 14 with threaded ends (hidden) traverse a movable lower rectangular platen assembly 18. A steel bottom or base plate assembly 20 is attached by four steel footings 22.

An injection accumulator assembly 24 (see FIG. 2) comprises an upright cylindrical injection accumulator vessel 26 openly housed by a square metal plate 28 supported by four corner studs 30 attached to the upper platen assembly 12. The accumulator vessel 26 has appended thereto a vacuum source hose 32 and an L-shaped feed material holding canister 34 having a predetermined volume capacity adequate to supply the vessel 26 with a preheated resin charge. Both hose 32 and canister 34 have manually or automatically operated shutoff valves 36. In the automatic mode, the valves 36 are controlled by a computer (not shown) along with automatic control of the hydraulic functions for feeding the resin to the closed mold. An injection piston 38 with several peripheral grooves on a hydraulically operated cylindrical shaft 40 is automatically controlled hydraulically to confine the preheated resin charge inside the injection accumulator vessel 26.

Turning to the upper platen assembly 12 (see FIG. 2), an upper match mold portion 42 is affixed underneath which matches the lower match mold portion 44 affixed to the upper surface of the lower platen assembly 18. The lower match mold portion 44 has four alignment pins 46 in each corner which penetrate four corresponding apertures 48 located in the upper match mold portion 42. The lower match mold portion 44 has a peripheral groove with an embedded sealing ring 50. The lower match mold portion 44 has two oppositely located side grooves 52 which cooperate with four clamps 54 attached to the lower platen assembly 18 to secure the lower match mold portion 44.

The fixed upper platen assembly 12 and the movable lower platen assembly 18 are both composed of a sandwich of a metal press plate 56, an insulating fiberboard 58 and an internally heated (electrically) metal platen 60. The platen 60 is adjacent to a mold portion.

The lower platen assembly 18 is moved along the four studs 14 to close the mold portions 42, 44 by four clamping hydraulic cylinders 62, each supported by four studs 64 in the bottom plate assembly 66. The studs 14 have footings 22 which also hold the upper platen assembly 12, the lower platen assembly 18 and the bottom base plate assembly 66 aligned.

Figure 2:
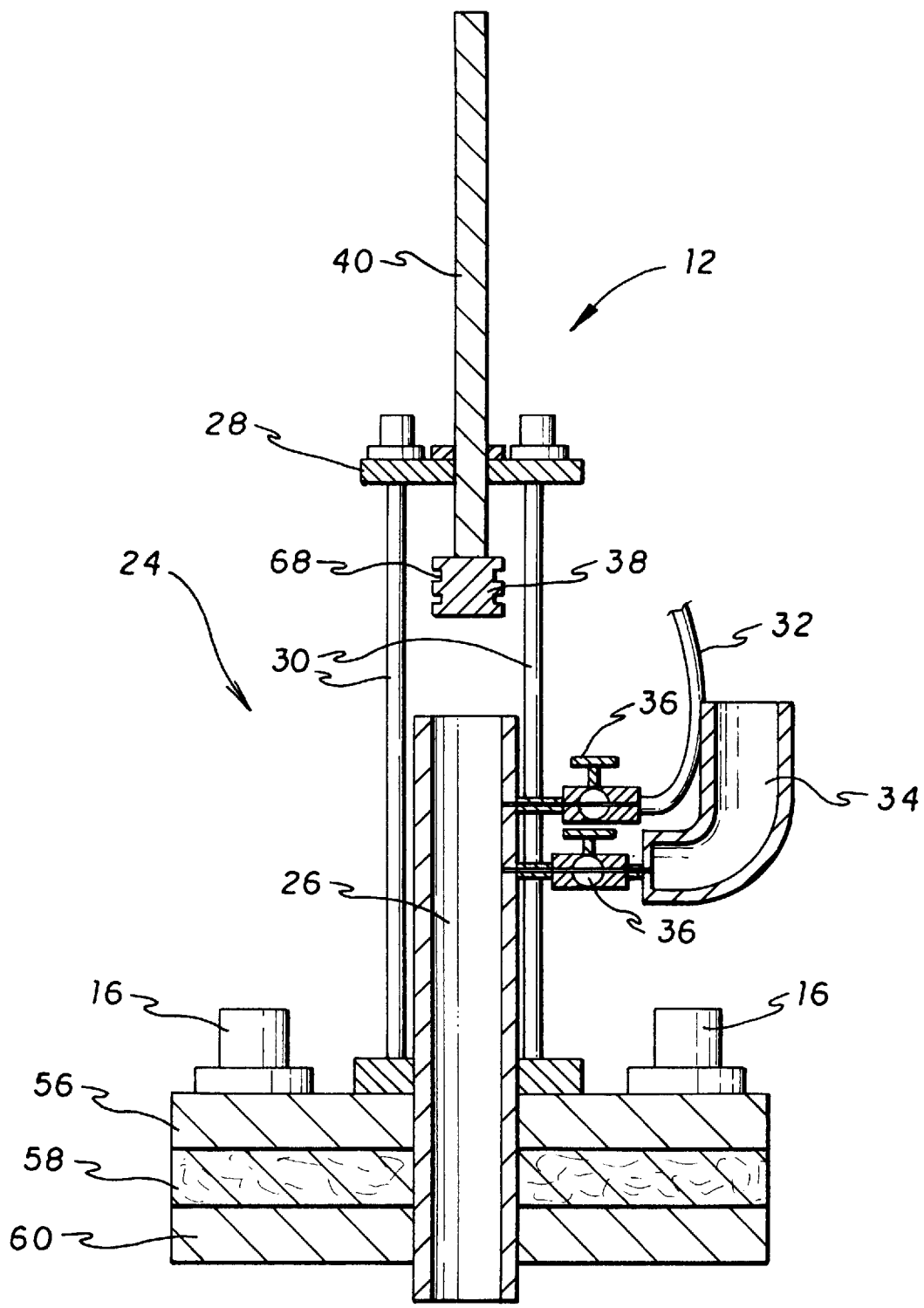
FIG. 2 is a partial sectional view of the apparatus along line 2—2 in FIG. 1.

Turning to the cross-sectional view of FIG. 2 taken along line 2—2 of the FIG. 1 press apparatus 10, no resin charge is shown. The injection piston 38 has several peripheral grooves 68 filled with O-rings (not shown). The piston 38 is driven by the piston shaft 40 which is energized by a hydraulic system (not shown) and under either manual or automatic control by a computer.

Figure 3:
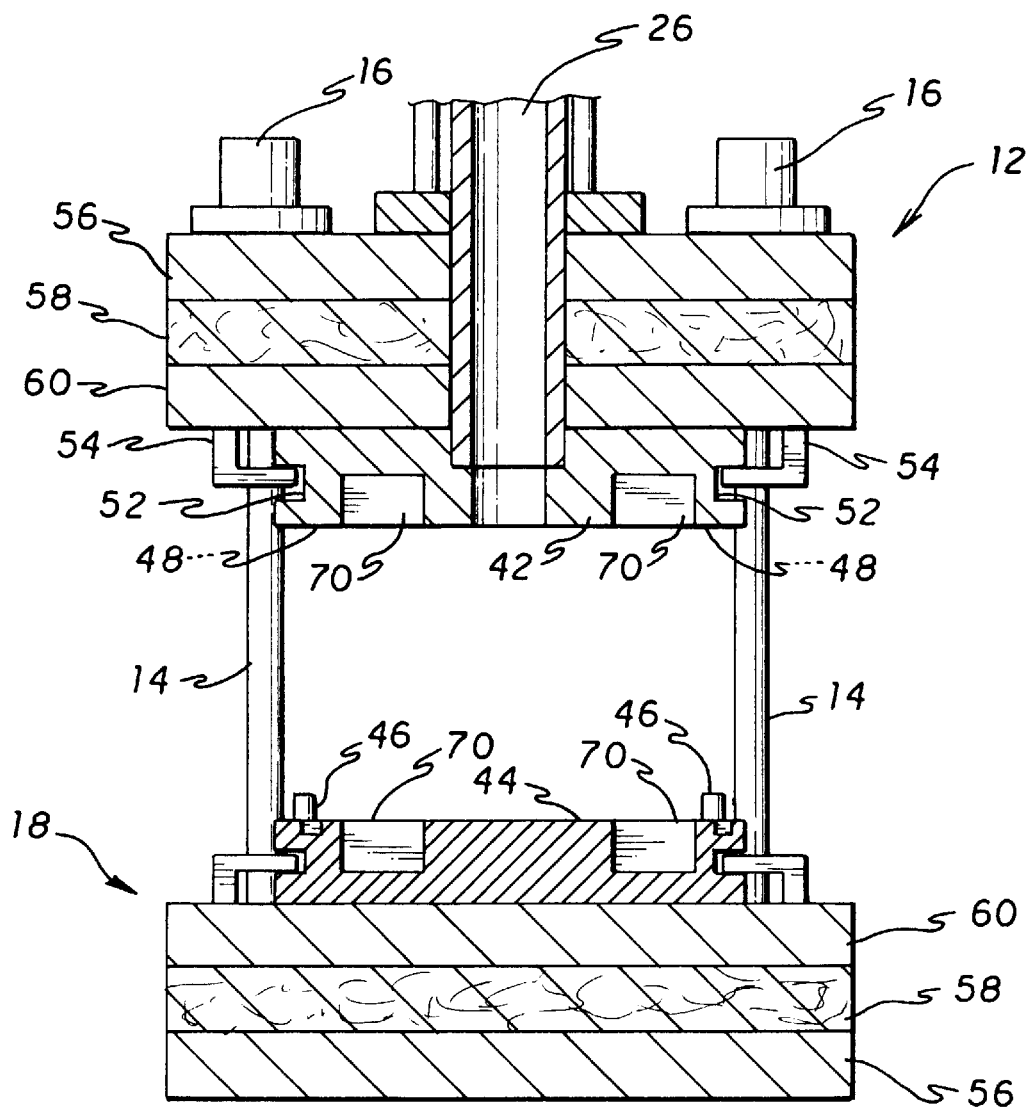
FIG. 3 is a partial sectional view of the apparatus along line 3—3 in FIG. 1.

Referring now to FIG. 3, a cross-sectional view of the respective upper and lower platen assemblies 12, 18 along line 3—3 of the FIG. 1 press apparatus 10 is depicted with a sandwich as noted above of an outside layer of a metal press plate 56, an intermediate layer of an insulating fiberboard 58, and an outside layer which is the electrically heated platen 60. The platen assemblies 12, 18 of the press apparatus 10 are apertured in the corners for the passage of the four metal studs 14. The match mold portions 42, 44 contain cavities 70 for forming the models by injection of the heated mixed resin charge. The remaining parts of the platen assemblies have been explained above.

The vacuum transfer molding process of the present invention will be described. A continuous fiber reinforcement is pre-cut and placed in the mold cavity 70. The fibers can be made of fiberglass, Kevlar (TM), boron, and carbon. Also, multiple layers of fabric made from the given materials in the form of a mat can be utilized. The press 10 is closed by actuating the hydraulically operated clamping cylinders 62 to apply a clamping pressure of 2500 p.s.i. which is held for the duration of the molding process.

A preheated charge of the mixed resin is added to the feed material canister 34 with its shutoff valve 36 closed. The injection piston 38 is lowered to seal the injection accumulator vessel 26. The shutoff valve 36 for the vacuum source hose 32 is opened to evacuate the air in the closed molding system and closed when a full vacuum has been achieved. Only 80 to 90% of the preheated resin charge in the feed material canister 34 is now permitted to enter the injection accumulator vessel 26 under the influence of the created vacuum by opening the shutoff valve 36.

When the valve 36 is closed again, the preheated mixed resin charge inside the injection accumulator vessel 26 is instantly degassed. The injection piston 38 is now further lowered into the injection accumulator vessel 26 by the hydraulic means to force the preheated mixed resin into the preheated it old cavity 70 and to maintain a pressure of 200 to 600 p.s.i. for the duration of the molding cycle with termination of heat to the molds.

After a predetermine amount of curing the (usually about 6–45 min.), the press 10 is opened by lower the lower platen assembly 18, and the model parts are removed from, the mold cavities 70. The injection pistol 38 is further lowered to pass through the upper match mold portion 42 in order to remove and clean the injection piston from its shaft 40. The hydraulic piston shaft is returned to its uppermost or starting position for affixing the injection piston. The respective upper and lower match mold portions 42 and 44 are cleaned and ready for the next molding cycle.

The mixed resin model products are further trimmed, scuffed and painted to form void-free, models.

The molded products made by the present process on this molding apparatus of the present invention have been found to be consistently without voids normally caused by inadequate degassing of the molding apparatus.

The method and apparatus of the present invention may utilized to produce such molded models as golf clubs, hollow baseball bats, compound archer bow risers, vehicle fenders, drum sticks and motorcycle fairings.

It is to be understood that the present invention is not limited to the embodiment described above, but encompasses any and all embodiments within the scope of the following claims.

I claim:

1. A method of making a model product from a mixed thermosetting resin by vacuum transfer molding in a mold having an upper fixed mold portion and a lower movable mold portion to enclose a mold cavity, a preheated resin holding canister, an injection accumulator vessel with an injection piston for pressuring preheated resin, and a gas exhaust path from said injection accumulator vessel to an evacuation pump, comprising the following steps:

creating a vacuum in the injection accumulator vessel and the mold cavity;

placing a quantity of preheated mixed resin into said resin holding canister;

transferring and degassing a quantity of said preheated mixed resin into said injection accumulator vessel closed with said injection piston;

transferring said degassed and preheated mixed resin into said mold cavity by lowering said injection piston;

sealing the mold portions to form said mold cavity by contacting said upper mold portion with said lower mold portion; and curing the mixed resin in the sealed mold cavity for a predetermine amount of time at an ambient temperature, thereby obtaining a void-free, mixed resin model product.

2. The method according to claim 1, including further heating said mold cavity amid said preheated and degassed mixed resin within said cavity by heating said upper and lower mold portions.

3. The method according to claim 1, including the steps of further trimming, scuffing and painting the molded model.

4. The method according to claim 1, including the step of molding a model of a golf club.

5. The method according to claim 1, including the step of molding a model of a hollow baseball bat.

6. The method according to claim 1, including the step of molding a model of a compound archer bow riser.

7. The method according to claim 1, including the step of molding a model of a vehicle fender.

8. The method according to claim 1, including the step of molding a model of a drum stick for a drummer.

9. The method according to claim 1, including the step of molding a model of a motorcycle fairings.

10. An apparatus for vacuum transfer molding a model with a mixed resin comprising:

a fixed upper platen assembly having affixed thereto an upper match mold portion on its lower surface, said lower surface having alignment apertures;

a movable lower platen assembly having affixed thereto a lower matching mold portion on its upper surface, said upper surface having alignment pins which align with said alignment apertures of said upper match mold portion;

a bottom base plate assembly; and a plurality of vertical studs;

said upper and lower platen assemblies and said bottom base plate assembly being supported by said vertical studs;

an injection accumulator assembly comprising:

a vertical cylindrical injection accumulator vessel;

an injection piston attached to an end of a hydraulically operated shaft;

a vacuum hose;

a feed material holding canister, said injection piston being reciprocally movable in said injection accumulator vessel by means of said hydraulically operated shaft, and said vacuum hose and said canister being attached to said vertical injection accumulator vessel; and said bottom base plate assembly comprising four clamping hydraulic cylinders supporting said lower platen assembly;

whereby a model is molded without voids when a mixed resin is added as a feed material to the injection accumulator vessel under an applied vacuum before molding.

11. The apparatus according to claim 10, including an apertured square plate supported by four vertical studs being attached to an upper surface of said upper platen assembly, whereby said apertured square plate and said four vertical studs support said hydraulic cylinder vertically.

12. The apparatus according to claim 10, said upper and lower platen assemblies each being composed of a sandwich of a press plate, an insulating fiberboard and an internally heated platen, and each heated platen being adjacent to its match mold.

13. The apparatus according to claim 10, wherein said lower match mold has a peripheral groove with a sealing ring.

14. The apparatus according to claim 10, said lower match mold having grooves on opposite sides for clamping said match mold by clamps to said bottom platen assembly.

15. The apparatus according to claim 10, each said vacuum hose and said feed material holding canister having shutoff valves selected from manual and automatic.

16. The apparatus according to claim 15, further comprising a computer controlling said automatic shutoff valves.

17. The apparatus according to claim 10, said injection piston having peripheral grooves filled with O-rings.

18. The apparatus according to claim 10, each said clamping cylinder being further supported by a base plate and four supporting rods.

* * * * *